United States Patent
De Cuir

[15] 3,645,684
[45] Feb. 29, 1972

[54] FRACTIONATION OF SILICA AEROSOLS

[72] Inventor: George L. De Cuir, Monroe, La.
[73] Assignee: Cities Service Company, New York, N.Y.
[22] Filed: July 1, 1970
[21] Appl. No.: 51,633

[52] U.S. Cl. ...........................23/182 V, 23/153, 23/182 P, 23/313
[51] Int. Cl. ..................................C01b 33/18, C01b 33/14
[58] Field of Search......................23/182, 182 V, 182 P, 153, 23/1, 313

[56] References Cited

UNITED STATES PATENTS

| | | | |
|---|---|---|---|
| 3,233,969 | 2/1966 | Heller | 23/182 V |
| 3,203,759 | 8/1965 | Flemmert | 23/182 V |
| 3,273,963 | 9/1966 | Gunn | 23/182 V |

Primary Examiner—Edward Stern
Attorney—J. Richard Geaman

[57] ABSTRACT

Pigmentary silica is produced by hydrolysis of silicon tetrafluoride in hot flame gases. The silica in the resultant aerosol is then agglomerated and the silica is thereafter filtered from the gases at a temperature above the dew point. The concentration of silica in the aerosol is substantially the same at filteration as when produced, i.e., little or none of the agglomerated silica is permanently separated from the aerosol prior to filtration.

10 Claims, 4 Drawing Figures

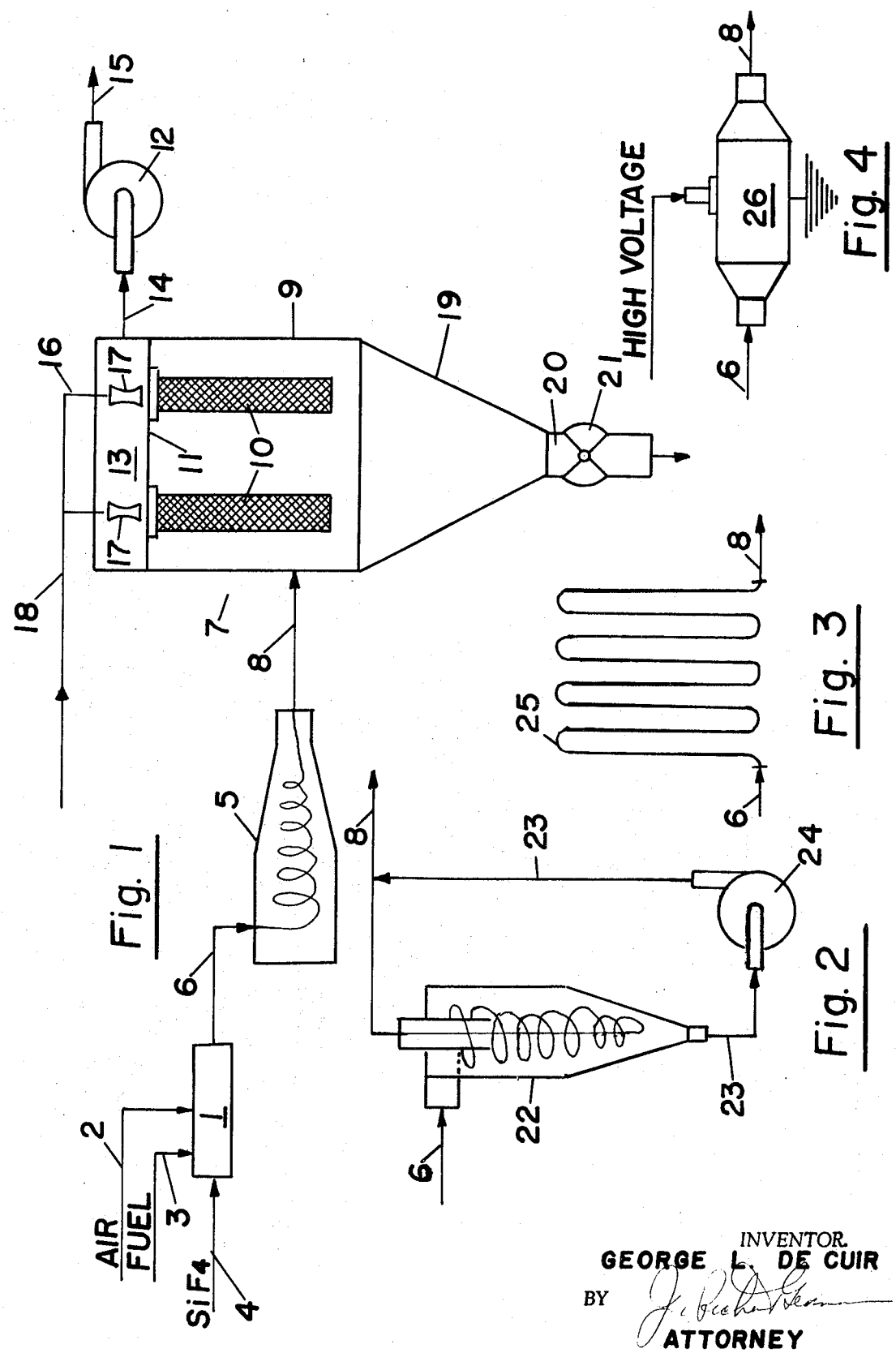

FRACTIONATION OF SILICA AEROSOLS

BACKGROUND OF THE INVENTION

Pigmentary silica, hereinafter referred to as "fumed silica," can be produced by hydrolysis of silicon tetrafluoride at temperatures in excess of about 1,100° F. The most commonly employed methods of hydrolysis are the "flame processes" whereby the silicon tetrafluoride is mixed with hot flame gases produced by burning a fluid fuel with a free oxygen-containing gas. Water for the hydrolysis reaction can be produced by combustion of the fuel or can be supplied from an extraneous source. Hydrolysis of the silicon tetrafluoride results in formation of an aerosol of extremely fine silica particles suspended in hot combustion gases, hydrogen fluoride, and, in some cases, water or other diluent vapors. The aerosol must be fractionated for recovery of the silica product from these gases. As a general rule, the silica is characterized by a mean particle diameter within the range of about 5 to about 50 millimicrons and a nitrogen surface area (B.E.T.) within the range of about 50 to about 500 m.$^2$/gm. Among other things, such silicas can be used for the reinforcement of silicone rubber, as a thickening agent for resins and greases, and as an anticaking agent for powders.

Prior methods for separating silica from aerosols produced by hydrolysis of silicon tetrafluoride have involved the use of a bag filter alone, an electrostatic and/or a mechanical agglomerator alone, or combinations of agglomerators with a bag filter whereby the silica in the aerosol is first agglomerated (flocculated) and is at least partially separated from the gases by means of one or more agglomerators, the bag filter being employed for removing final traces of silica which may remain in the aerosol.

The disadvantage of using a bag filter alone is clearly indicated in U.S. Pat. No. 3,203,759, for as noted therein, the recovery of silica by means of Teflon or ceramic filters is as low as 2 to 20 percent. In this same patent it is also disclosed that electrostatic precipitators give poor recovery of silica from the aerosol to the extent that the process is uneconomical. In accordance with the process of the aforementioned patent, the silica is separated from the aerosol by means of mechanical precipitators such as cyclones, centrifugal separators, impingement precipitators and gravimetric precipitation chambers. From the examples of the patent it can be determined that recovery of the silica by means of mechanical precipitators alone is within the range of about 60 to about 70 weight percent. While recovery within this range is not necessarily uneconomical, it nonetheless represents an objectionably high loss of valuable silica product.

It would therefore seem that the most efficient method of separating the silica from the aerosol would be through use of the methods described in U.S. Pat. Nos. 3,233,969 and 3,273,963 whereby the silica is first agglomerated by passage of the aerosol through an electrostatic and/or one or more centrifugal precipitators, thus stripping some of the silica from the aerosol by means of precipitation, followed by subsequent passage of the silica stripped aerosol to a bag filter for final removal of any silica which remains therein. It has now been determined, however, that such a combination of one or more precipitators with a bag filter provides little or no advantage over use of mechanical and/or electrostatic precipitation alone, e.g., recovery of the silica rarely exceeds 50–70 weight percent, with only a small fraction of this being separated by the bag filter.

SUMMARY OF THE INVENTION

It is therefore an object of this invention to provide a method whereby pigmentary silica aerosols which are produced by hydrolysis of silicon tetrafluoride, can be fractionated for highly efficient recovery of the silica from the gases of the aerosol. Other objects and advantages of the invention will become apparent from the following description and the appended claims.

The present invention is based on the discovery that the ability of a filter media to separate the silica is dependent upon the extent to which the silica particles within the aerosol are agglomerated, or flocculated, when passed to the filter. As produced, the silica particles are discretely dispersed within the gases of the aerosol and will remain so unless flocculated by means of an electrostatic or mechanical agglomerator. If the unflocculated silica is passed to a filter, the particles simply pass through the openings thereof so that recovery of the silica by means of the filter is very low or nil. Little or no improvement in filtration occurs by preagglomeration of the silica if a substantial portion of the agglomerates are permanently separated from the aerosol prior to filtration since (1) the concentration of silica in the aerosol is significantly reduced at the time of filtration, and (2) the silica in the aerosol will consist to a large extent of small, unflocculated particles which will continue to pass the filter.

In accordance with the present invention, therefore, the silica in the aerosol is first agglomerated and is thereafter filtered at a mass rate which is at least about as great as the rate at which the silica is agglomerated. In other words, no substantial permanent separation of the flocculated silica from the aerosol is effected prior to filtration. While not wishing to be bound by theory, it appears that efficient filtering of the silica depends upon accumulation on the filter media of a relatively porous cake which is composed of the flocculated silica particles. This cake apparently serves as the primary filtering media for the silica, being more effective than the filtering media per se for separation of fine, unflocculated particles from the gases.

By means of this invention, the silica can be separated from the gaseous fraction of the aerosol, to effect recovery within the range of about 90–99 weight percent, simply by maintaining the aerosol above the dew point of the gases. More particularly, the silica can be recovered at these efficiencies while maintaining filtration temperatures within the range of about 300° to about 450° F. whereby condensation of the aerosol gases is essentially avoided in any case while using readily available and workable filter media such as Teflon or Nomex. Ceramic filter media can be used at temperatures in excess of about 600° F., while deleterious condensation of the aerosol gases becomes more and more likely as the temperature is reduced below about 300° F., i.e., condensation results in formation of fluosilicic acid from silica, hydrogen fluoride and water vapor in the aerosol, such that yield and quality of the silica product is seriously affected.

It is nonetheless surprising that silica can be efficiently recovered in accordance with the present invention at temperatures below about 600° F. in view of the generally accepted reversibility of the following reaction at temperatures below about 600° F.:

$$SiF_4 + 2H_2O \rightleftharpoons SiO_2 + 4HF$$

Heretofore, the reverse reaction of silica back to silicon tetrafluoride at temperatures below about 1,100° F. has been avoided to some extent by cooling and diluting the aerosol, prior to recovery of the silica, by means of a diluting gas such as air, water vapor, nitrogen, carbon dioxide, inert gases, or exhaust gases from the flame hydrolysis reaction. By means of the present invention, however, the addition of a cooling and diluting gas to the aerosol is not necessary for recovery of the silica in the previously noted temperature range, and is generally avoided since further dilution of silica in the gases is usually detrimental to filtration of the silica, i.e., with ideal hydrolysis conditions the concentration of silica in the gases of the aerosol may not exceed about 12 grains per standard cubic foot prior to any dilution, and it will be appreciated that such a concentration is in itself almost too dilute for practical recovery of the silica. It is therefore conjectured that the high-recovery efficiencies made possible by the present invention results not only from better filtration by virtue of a porous cake accumulation on the filter media but also because the silica is less subject in such a condition to reaction with hydrogen fluoride.

As previously indicated, Teflon and Nomex filter media can be employed to advantage. Felts are particularly desirable while providing at least about 10 square feet of cloth for each pound per hour of silica that is passed to the filter.

Any suitable agglomerating apparatus may be employed in this invention for flocculation of the silica in the aerosol prior to filtration. The agglomerator should, of course, effect substantial flocculation of the silica and may be a centrifugal, tubular, or electrostatic type. Where preferred, a cyclone may be employed whereby the silica is first flocculated and to a substantial extent separated from the aerosol, while thereafter being returned to the gases of the aerosol prior to filtration.

The present invention is of course, applicable to any flame process wherein pigmentary silica is produced by hydrolysis of silicon tetrafluoride in hot flame gases, but can be used to particular advantage with the processes described in U.S. Pat. Nos. 3,233,969; 3,272,963 and copending applications Ser. No. 51,622, filed July 1, 1970 and Ser. No. 51,632, filed July 1, 1970, all of which are assigned to the same assignee as this application.

BRIEF DESCRIPTION OF THE DRAWINGS

FIG. 1 is a somewhat diagrammatical flowsheet, partly in section, of one embodiment of the present invention.

FIGS. 2, 3, and 4 represent other agglomerators which can be employed in the practice of the invention in place of, or in combination with, the agglomerator shown in FIG. 1.

DESCRIPTION OF THE PREFERRED EMBODIMENTS

In FIG. 1, a hydrolyzer is represented at 1. Air and fuel, e.g., natural gas, are introduced into the hydrolyzer through lines 2 and 3, respectively, for formation of a flame. Silicon tetrafluoride to be hydrolyzed for formation of pigmentary silica is introduced into the hydrolyzer through line 4. The air and fuel are burned within the hydrolyzer to produce hot flame gases which are mixed therein with the silicon tetrafluoride to produce a reaction mixture above about 1,100° F. Should water vapor other than that produced by the flame be required for hydrolysis of the silicon tetrafluoride, it may be introduced in mixture therewith through line 4 (while maintaining the mixture above the dewpoint to prevent premature hydrolysis of the silicon tetrafluoride). The resulting hydrolysis of the silicon tetrafluoride in the hydrolyzer 1 causes formation of an aerosol of pigmentary silica in hot combustion gases, hydrogen fluoride and water vapor. The aerosol is conveyed from the hydrolyzer into a mechanical agglomerator, represented at 5, through line 6. The agglomerator represented in FIG. 1 is a centrifugal type wherein the aerosol is spun at a relatively high velocity, e.g., 60–100 ft./sec., to effect flocculation of the silica, but without any separation of the silica from the gases. The resulting unfractionated aerosol containing the silica in flocculent form is then passed directly into a bag filter, generally represented at 7, through line 8. The bag filter comprises a housing 9 for the bags 10 which are suspended from a hanger plate 11. The bottom ends of the bags are closed and are supported internally by metal cages, not shown. The flow of gas to and through the filter bags is maintained by a blower, represented at 12. Flocculated silica is filtered from the aerosol by means of bags 10 and accumulates as a porous cake on the outer surface thereof. Filtered aerosolic gases exit from the top of the bags and are withdrawn from space 13 through line 14 by means of the blower. Subsequently, these separated gases can be passed through line 15 to an absorption unit for the recovery of hydrogen fluoride.

In the illustrated case, the filter cake on the bags is removed periodically by raising the pressure in the bags so that their walls are rapidly flexed outward. This is accomplished by means of jets, represented at 16, which inject a high-velocity stream of air through venture aspirators 17 so that a mixture of air and filtered aerosol gases is forcefully injected into the interior of the bags. Air is furnished to the jets through a supply line 18, being introduced at preestablished intervals by means of automatic controls. Alternately, the bags could be cleaned by periodic shaking; and by means of other arrangements, the silica could be separated on the inside of the bags rather than the outside.

Silica which is dislodged from the walls of the bags by the cleaning action falls into a hopper 19 of the bag filter and is removed therefrom through line 20 in the form of a dry, loose, substantially dry powder. Line 20 is provided with a rotary gas lock 21 which permits discharge of the silica from the filter while preventing inspiration of air through line 20. To advantage, the recovered silica can be treated for removal of traces of fluorine chemicals, which may remain thereon, by means of the process described in U.S. Pat. No. 3,511,605, and assigned to the same assignee as this application.

Alternate methods for flocculating the silica in the aerosol prior to filtration are illustrated in FIGS. 2, 3, and 4. In FIG. 2, the silica aerosol is conveyed from the hydrolyzer through line 6 into a cyclone separator represented at 22. Within the cyclone, the aerosol is spun at about 60–100 ft./sec. to effect flocculation of the silica and substantial separation thereof from the aerosolic gases. Silica-stripped gases are discharged from the top of the cyclone and conveyed toward the bag filter through line 8. Separated silica is removed through the solids discharge outlet of the cyclone and is conveyed into line 8, through line 23, by means of a blower 24. Accordingly, the flocculated and separated silica is reentrained in the gases of the aerosol, whereby no permanent separation of the silica from the gaseous fraction of the aerosol is effected prior to filtration.

FIG. 3 shows a tubular agglomerator, represented at 25. Accordingly, the aerosol from line 6 is fed into an elongate tube wherein sufficient contact time at suitable turbulent conditions is established for flocculation of the silica before the aerosol is passed into the bag filter through line 8. For compactness, the tube may be provided with a serpentine configuration as illustrated in FIG. 3.

FIG. 4 represents an electrostatic precipitator at 26. The precipitator contains a series of positively and negatively charged plates, not shown, which are spaced apart to create charged fields through which the aerosol flows after entering the precipitator through line 6. The silica is thus flocculated electrostatically and is conveyed into the bag filter through line 8 while still entrained in the gases of the aerosol. Preferably, none of the silica is separated from the aerosol by means of the precipitator, but an arrangement as shown in FIG. 2 can be employed, if desired, whereby some of the flocculated silica is first separated and is then returned to the aerosol gases in line 8 prior to passage into the bag filter.

As previously indicated, one or more agglomerators, of the same or different types, may be employed in accordance with the present invention for flocculation of the silica prior to filtration of the aerosol.

EXAMPLE I

Using a hydrolysis process substantially as described in U.S. application Ser. No. 51,622 and filed July 1, 1970, air and natural gas were supplied to the hydrolysis chamber at the rates of 3,000 SCFH and 250 SCFH, respectively, to produce a combustion flame. Silicon tetrafluoride was introduced into this flame at the rate of about 8.70 lbs./hr. and was hydrolyzed therein to produce pigmentary silica at the rate of 5 pounds per hour. The resulting aerosol was then cooled to about 500° F. and was then introduced directly into the bag collector without preflocculation of the silica. Teflon felt was employed as the filter media. The bag filter was constructed and operated substantially in accordance with the previous description in reference to FIG. 1, the interior being maintained at about 400°–450° F. Silica was discharged from the filter at the rate of about 0.5 lbs./hr. which represents a recovery efficiency of only about 10 weight percent.

EXAMPLE II

Substantially the same conditions and apparatus were employed as in Example I except that a cyclone separator having an inlet velocity of 60 feet/sec. was located between the hydrolyzer and the bag filter. In this case, a portion of the flocculated silica was permanently separated from the aerosol by means of the cyclone and the silica-stripped gases were then passed into the bag filter for removal of any silica which remained therein. Silica was recovered from the cyclone at the rate of about 3 pounds per hour while being recovered from the bag filter at the rate of about 0.5 pounds per hour. This represents an overall recovery efficiency of about 70 weight percent.

EXAMPLE III

Substantially the same operating conditions and apparatus were employed as in Example I except that a centrifugal separator was employed as described and illustrated with reference to FIG. 1, which represents an embodiment of the invention, since the silica was flocculated but not separated from the aerosol prior to filtration. In this case, the silica was collected at the rate of about 4.9 lbs./hr. which represents a recovery efficiency of about 97 weight percent.

In each of the foregoing experiments, temperatures throughout the system were maintained above the dewpoint of the gases of the aerosol to prevent back-reaction of the silica and formation of fluosilicic acid.

While the present invention has been described with reference to particular conditions, apparatus, and arrangements thereof, it will be understood that other embodiments will become apparent which are within the spirit and scope of the invention as is described in the appended claims.

Therefore, what is claimed is:

1. In a process for producing pigmentary silicon dioxide by hydrolysis of silicon tetrafluoride at a temperature above 1,100° F. in hot flame gases, the improved method of recovering the silica from the resultant aerosol which comprises:
   a. flocculating the silica particles within said aerosol,
   b. thereafter passing the aerosol to a filter media as a substantially unfractionated aerosol which contains the silica in flocculent form, filtering the aerosol at a temperature above the dew point of the gases therein and recovering the resulting filtered silica in amounts of about 90–99 weight percent of the silica produced by said hydrolysis of said silicon tetrafluoride.

2. The process of claim 1 wherein the aerosol is filtered at a temperature within the range of about 300° F. to about 600° F.

3. The process of claim 1 wherein the silica particles are flocculated within a centrifugal agglomerator.

4. The process of claim 1 wherein the silica particles are flocculated within a tubular agglomerator.

5. The process of claim 1 wherein the silica particles are flocculated within an electrostatic precipitator.

6. The process of claim 1 wherein the aerosol is filtered at a temperature within the range of about 300° F. to about 450° F.

7. The process of claim 6 wherein the aerosol is filtered with a Teflon media.

8. The process of claim 6 wherein the aerosol is filtered with a Nomex media.

9. The process of claim 1 wherein the concentration of silica in the aerosol does not exceed about 12 grains per standard cubic foot of the gaseous fraction of the aerosol.

10. The process of claim 1 wherein at least about 10 square feet of filter media is provided for each pound per hour of silica which is passed to the filter.

* * * * *